United States Patent [19]

Usami et al.

[11] 4,126,782

[45] Nov. 21, 1978

[54] ELECTROSTATIC CHARGED-PARTICLE ANALYZER

[75] Inventors: Katsuhisa Usami, Tokyo; Isao Ishikawa, Hino, both of Japan

[73] Assignee: Hitachi, Ltd., Japan

[21] Appl. No.: 762,719

[22] Filed: Jan. 26, 1977

[30] Foreign Application Priority Data

Feb. 9, 1976 [JP] Japan .................................. 51/12283
Jun. 9, 1976 [JP] Japan .................................. 51/66541

[51] Int. Cl.$^2$ ........................ G01M 23/00; H01J 39/00
[52] U.S. Cl. ........................................ 250/305; 250/310
[58] Field of Search ......................... 250/281, 305, 310

[56] References Cited

U.S. PATENT DOCUMENTS

| | | | |
|---|---|---|---|
| 3,783,280 | 1/1974 | Watson | 250/305 |
| 3,787,692 | 1/1974 | Anderson | 250/305 |
| 3,805,057 | 4/1974 | Yanagisawa et al. | 250/305 |

*Primary Examiner*—Harold A. Dixon
*Attorney, Agent, or Firm*—Craig & Antonelli

[57] ABSTRACT

An electrostatic charged-particle analyzer includes a deflecting electrode system which focuses charged particles emitted from a sample by irradiating the sample with a primary beam, the particles being focused on the axis of the primary beam or on an identical circumference about the axis, and a cylindrical mirror type analyzer whose object point is the focusing point, whereby the accepted solid angle for the charged particles is made large.

6 Claims, 8 Drawing Figures

ELECTROSTATIC CHARGED-PARTICLE ANALYZER

BACKGROUND OF THE INVENTION

This invention relates to an electrostatic charged-particle analyzer.

In recent years, the technology of the surface analysis of a sample has been remarkably advanced. It is extensively carried out to determine the composition, the electronic structure, etc., of a sample by irradiating the sample with a primary beam, such as electron beam, ion beam or an X-ray beam, and by analyzing the energy of the charged particles such as Auger electrons, scattered ions and photoelectrons emitted from the surface of the sample.

In general, the emitted charged particles are of low energy. In order to enhance the analytical sensitivity, therefore, it is necessary to more efficiently detect the emitted charged particles. To this end, it is desirable to increase the ratio of the solid angle of charged particle rays entering a detector (accepted solid angle) relative to the entire solid angle of charged particle rays emitted from the sample surface in response to the irradiation thereby by the primary beam.

Examples of charged particle analyzers for providing an enhanced detecting efficiency which have hitherto been proposed are shown in FIGS. 1 and 2 in connection with an Auger electron spectrometer as an example.

In the construction of the prior-art charged-particle analyzer as shown in FIG. 1, numeral 1 designates an electron gun portion, numeral 2 a focusing and deflecting system for a primary electron beam, numeral 3 a sample, numeral 4 Auger electrons emitted from the sample by irradiation with the primary electron beam, numeral 5 a detector, and numeral 6 a cylindrical mirror type analyzer. A feature in the construction of this charged-particle analyzer having heretofore been used is that, since the axis of the primary electron beam and the axis of the cylindrical mirror type analyzer 6 are coincident, the detecting efficiency of the Auger electrons 4 emitted from the surface of the sample 3 is very high. Another advantage is that, since the electron gun portion 1 is disposed outside the cylindrical mirror type analyzer 6, the evacuating operation is easy.

The prior-art charged-particle analyzer shown in FIG. 1, however, is disadvantageous in that, since the focusing and deflecting system 2 is of the electromagnetic type and is disposed inside a cylindrical electrode of the cylindrical mirror type analyzer 6, the Auger electrons 4 are subject to the influence of a leakage magnetic field, resulting in a lowering of the energy resolution. Moreover, since the primary electron beam passes in close proximity to the detector 5, scattered electrons ascribable to the scattering of the primary electron beam occur, and some of them enter the detector 5 to cause a lowering of S/N (signal-to-noise) ratio.

On the other hand, in a structure wherein the electrostatic type of focusing and deflecting system is used, and wherein it is disposed inside the cylindrical electrode of the cylindrical mirror type analyzer 6 along with the electron gun portion 1, the areal resolution on the sample 3 is degraded. Especially in case where a field emission type electron gun is employed, the evacuation of the electron gun portion 1 becomes a problem.

The difficulties of the prior-art charged-particle analyzer shown in FIG. 1 are solved to some extent by another system, which is illustrated in FIG. 2. FIG. 2 is a constructional view of the charged-particle analyzer disclosed in Japanese Utility Model Laid-open Publication No. 15286/1975.

In the figure, numeral 1 designates an electron gun portion, numeral 2 a focusing and deflecting system for a primary electron beam, numeral 3 a sample, numeral 4 Auger electrons emitted from the sample by irradiation with the primary electron beam, numeral 5 a detector, numeral 7 a parallel plate type analyzer, numeral 8 a slit plate, and numeral 9 a deflecting and focusing system.

In this example, the Auger electrons 4 emitted from the sample 3 are analyzed by the parallel plate analyzer 7, and they are focused on a circumference about the axis of the primary electron beam. They pass through the slit plate 8 disposed at this position, and further advance outwards with respect to the axis. They are deflected towards the axis by the deflecting and focusing system 9, and are detected by the detector 5 disposed on the axis of the primary electron beam.

Owing to such construction, the electron gun portion 1, the focusing and deflecting system 2 and the parallel plate type analyzer 7 can be separately and individually formed. This solves the problem of the evacuation of the electron gun portion 1, the problem of the lowering of the energy resolution due to the leakage magnetic field, the problem of the lowering of the S/N ratio, and the problem of the degradation of the areal resolution on the sample surface.

In this case, however, considering the accepted solid angle, it is understood that a measurement at a high energy resolution is difficult. In the example of FIG. 2 of the charged-particle analyzer having heretofore been used, the accepted solid angle is determined by the effective solid angle of the parallel plate type analyzer 7.

In general, the ratio T of the accepted solid angle to the whole solid angle of the parallel plate type analyzer 7 is given by the following equation under the optimum conditions:

$$T = \Omega/\Omega_o = 2\,\alpha_o \sin 45^\circ$$

Here, $\alpha_o = \sqrt{\Delta/10}$ (where $\Delta$ denotes the energy resolution). Assuming, for example, $\Delta = 1 \times 10^{-2}$, the value of $T$ becomes:

$$T = 4.47 \times 10^{-2}$$

In the structure employing only the cylindrical mirror type analyzer as in the prior-art charged-particle analyzer illustrated in FIG. 1, the ratio $T$ of the accepted solid angle to the whole solid angle is $T = 10.32 \times 10^{-2}$. As compared with this value, the value $T$ of the structure of FIG. 2 is small. Accordingly, the performance of the example of FIG. 2 lowers considerably in this aspect.

SUMMARY OF THE INVENTION

An object of this invention is to provide an improved electrostatic charged-particle analyzer.

Another object of this invention is to provide an electrostatic charged-particle analyzer in which the accepted solid angle of the rays of charged particles emitted from a sample surface by irradiation with a primary beam is large.

These and other objects are accomplished by an electrostatic charged-particle analyzer in apparatus for analyzing charged particles emitted from a sample by irradiation with a primary beam, characterized by a deflecting electrode system which focuses the charged particles on the axis of the primary beam or an extension thereof or on an identical circumference about the axis or the extension, a slit which is disposed at the focusing position of the charged particles, a cylindrical mirror type analyzing system whose object point is the focusing position, and a detector which detects the charged particles from the cylindrical mirror type analyzing system.

DETAILED DESCRIPTION OF THE INVENTION

Hereunder, the electrostatic charged-particle analyzer according to this invention will be described in detail in connection with the preferred embodiments thereof.

In general, with an axially-symmetric deflecting electrode, it is possible by approximately selecting the configuration and applied voltage thereof that an electron beam emitted from one point will be again focused on one point or an annulus of arbitrary diameter in at least the first order of an aperture angle. Further, a cylindrical mirror type analyzer can focus an object point lying on an axis or an anular object point lying at an arbitrary distance outside the axis, onto the axis or an arbitrary annulus outside the axis.

This invention exploits the characteristics of the deflecting electrode and the cylindrical mirror type analyzer and couples both these devices, and provides an electrostatic charged-particle analyzer which has solved the difficulties in the characteristics of the prior-art charged-particle analyzers, in which electrons emitted from a sample are greatly curved by the deflecting electrode so as to intersect on the axis again, to achieve simplification and miniaturization of the apparatus itself, and which makes it possible to set a large accepted solid angle and to analyze a sample of large area.

Figure 1:
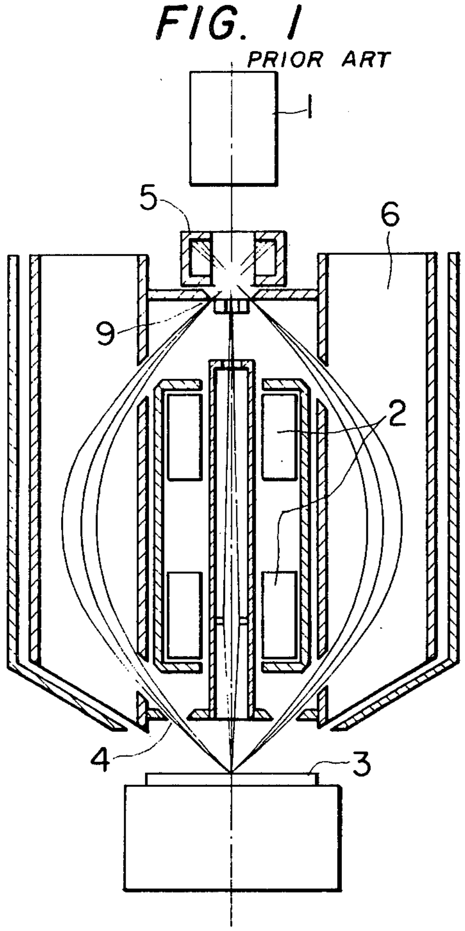
FIG. 1 PRIOR ART
FIGS. 1 and 2 are schematic structural views each showing a prior-art charged-particle analyzer.
Figure 2:
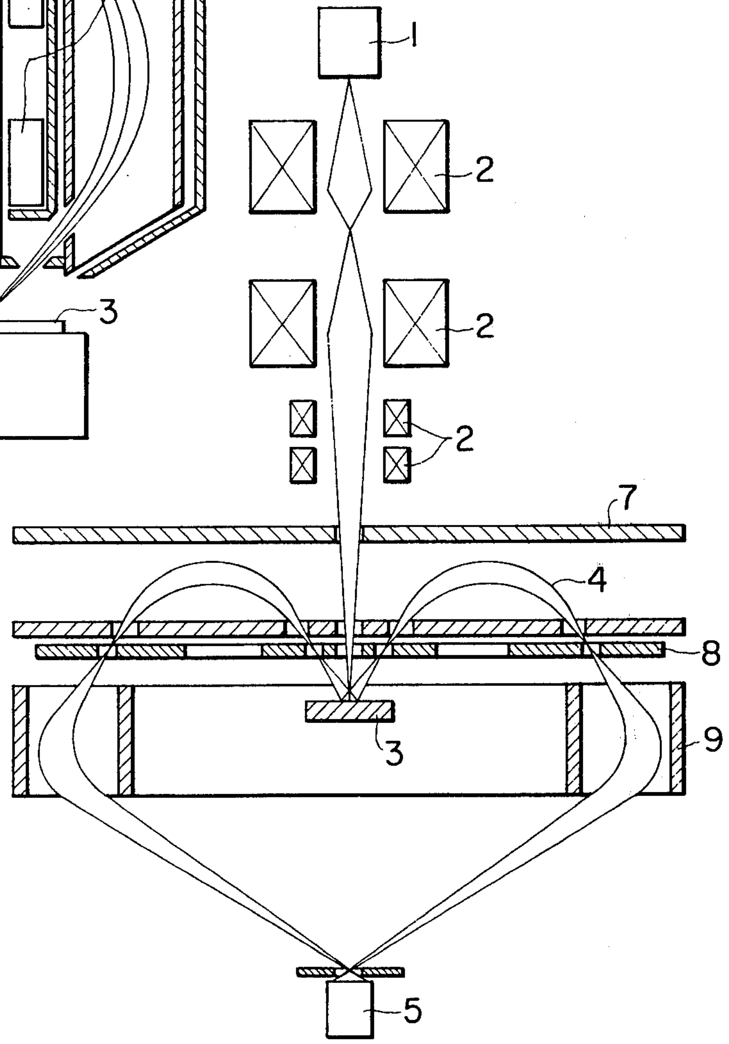
FIG. 2 PRIOR ART
Figure 3:
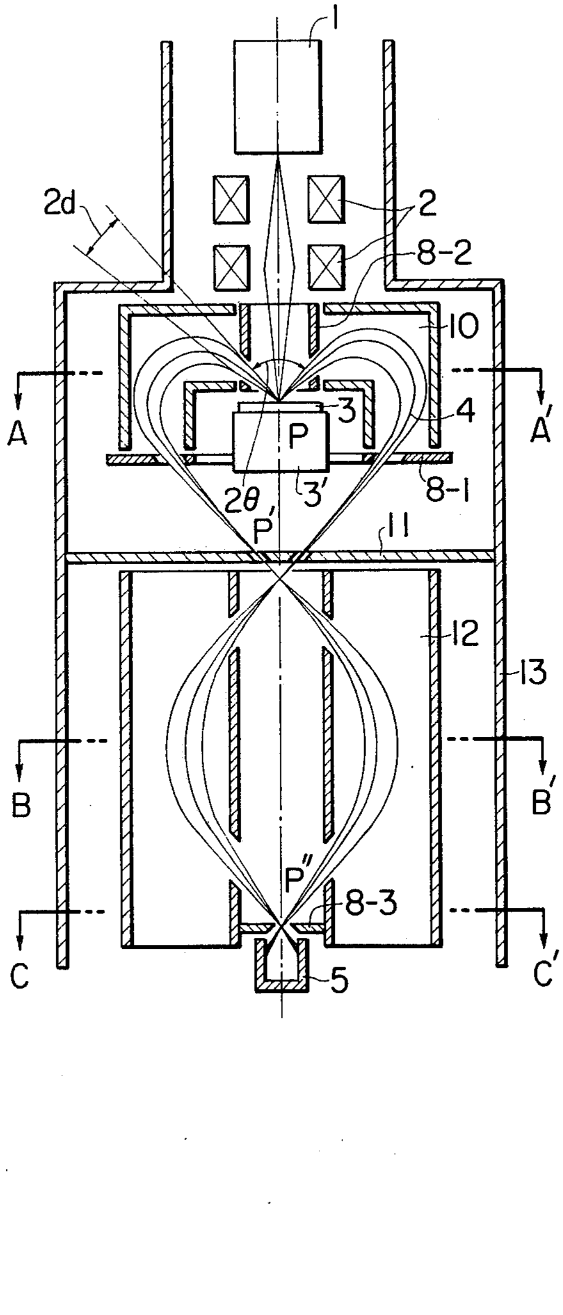
FIG. 3 is a schematic structural view showing an embodiment of the electrostatic charged-particle analyzer according to this invention.

FIG. 3 is a constructional view of an embodiment in which this invention is applied to the Auger electron spectrometer. In the figure, numeral 1 designates an electron gun portion, numeral 2 a system for focusing and deflecting a primary electron beam, numeral 3 a sample, numeral 4 Auger electrons which are emitted from the sample by irradiation with the primary electron beam, numeral 5 a detector, numeral 3' a sample stand which contains a sample fine-adjustment mechanism therein, numerals 8-1, 8-2 and 8-3 slits, numeral 10 a deflecting electrode system, numeral 11 a plate which has an annular slit at a central part thereof, numeral 12 a cylindrical mirror type analyzing system, and numeral 13 a vacuum container.

When the sample 3 is irradiated by the primary electron beam generated in the electron gun portion 1, the Auger electrons which have substantially a cosine-law spacial distribution are emitted from a point of irradiation P. Among the Auger electrons, the rays of electrons surrounded by two cones whose vertexes are the point P and whose half vertical angles are $\theta + \alpha$ and $\theta - \alpha$ pass through the slit 8-2 and enter the deflecting electrode system 10.

As shown in FIG. 3, the deflecting electrode system 10 is constructed of two electrodes which are axially symmetric and whose sections are L-shaped. The sample stand 3' containing the sample fine-adjustment mechanism therein can be disposed in the internal space of the inner electrode.

Since, in this manner, the deflecting electrode system 10 is made up of the two electrodes of L-shaped sections, its structure is very simple, and the internal space of the inner electrode is large enough to insert a sample of large area.

The rays of Auger electrons having entered the deflecting electrode system 10 are greatly curved by the deflecting electric field. Only the electrons having energies in a comparatively narrow range pass through the slit 8-1 and rectilinearly travel in the free space. The plate 11 is provided with the annular slit P' on an identical circumference about the extension of the axis of the primary electron beam. The rays of Auger electrons converge on the slit P' in at least the first order of the angle $\alpha$.

The rays of electrons having passed through the slit P' travel in a manner to intersect on the axis. They are analyzed by the cylindrical mirror type analyzing system 12 which is arranged with the position P' made an object point. Only the electrons having specific energies are focused on the slit 8-2 disposed at the point P'' on the axis, and are detected by the detector 5 located behind it.

When voltages to be applied to the respective electrodes of the deflecting electrode system 10 and the cylindrical mirror type analyzing system 12 are scanned at fixed ratios, the orbits of the electrons do not depend on the energy, and it becomes possible to obtain the energy spectrum of the electrons emitted from the sample.

When, in the electrostatic charged-particle analyzer according to this invention, the configuration and applied voltages of the deflecting electrode system 10 are appropriately selected, the electron rays can also be focused onto a point on the axis by the deflecting electrode system 10.

In this case, when the plate 11 is used as a partition wall for separating a sample chamber containing the sample 3 as well as the deflecting electrode system 10 and a chamber portion containing the cylindrical mirror type analyzing system 12, differential evacuation owing to the apertures in the plate 11 becomes possible, and the degree of vacuum in the sample chamber can be enhanced.

When, in the electrostatic charged-particle analyzer according to this invention, the deflecting electrode system 10 and the cylindrical type analyzer 12 are split into a plurality of parts on planes containing the axis, the electron rays after the analysis are converged into the form of an annulus and a number of detectors equal to the number of split parts are disposed at the converging positions, then it is possible to simultaneously perform the analyses of the electrons having different energies by applying different voltages to the respective split electrode parts.

Figure 4A:
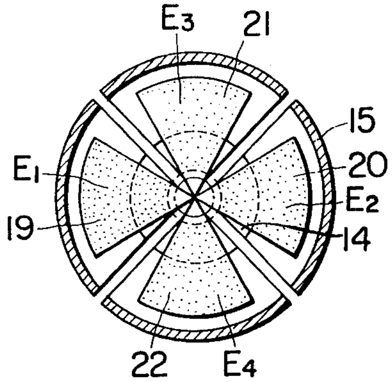
FIGS. 4A, 4B and 4C are sectional views taken along lines A-A', B-B' and C-C' in the embodiment of FIG. 3, respectively.
Figure 4B:
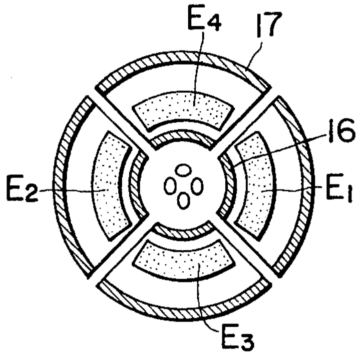
Figure 4C:
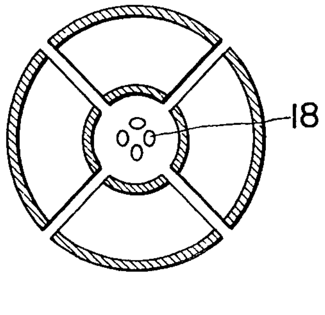

FIGS. 4A, 4B and 4C are sectional views showing the constructions of such split type electrodes. The sections in FIGS. 4A, 4B and 4C are a section AA', a section BB' and a section CC' in the case of forming the embodiment of FIG. 3 into the split type, respectively.

In FIG. 4A, numerals 14 and 15 designate split deflecting electrodes, and numerals 19, 20, 21 and 22 denote electron rays of energies $E_1$–$E_4$, respectively.

In FIG. 4B, numerals 16 and 17 indicate split inner and outer electrodes of the cylindrical mirror type analyzing system. In FIG. 4C, numeral 18 indicates the plural detectors.

The splitting of the deflecting electrode system, etc., in the planes containing the axis are not restricted to the case where the splitting produces axial symmetry, but the electrode system, etc., may be split into an odd number of parts in planes outwardly extending radially from the axis.

Figure 5:
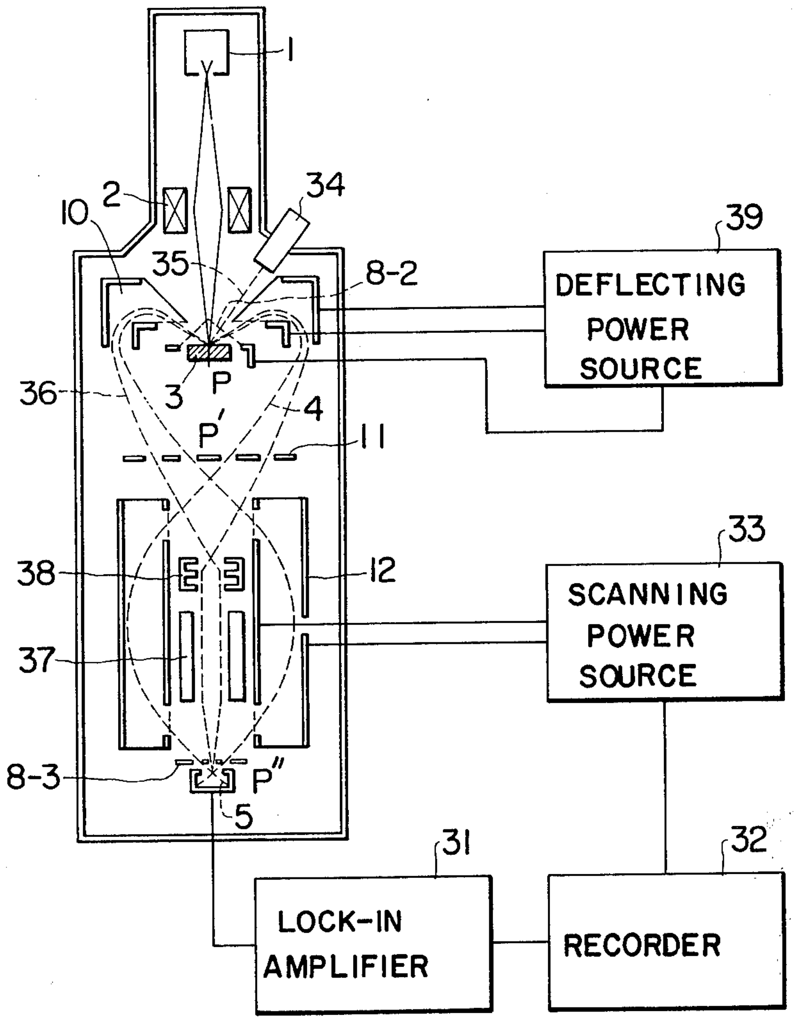
FIG. 5 is a schematic structural view showing another embodiment of the electrostatic charged-particle analyzer according to this invention.
Figure 6:
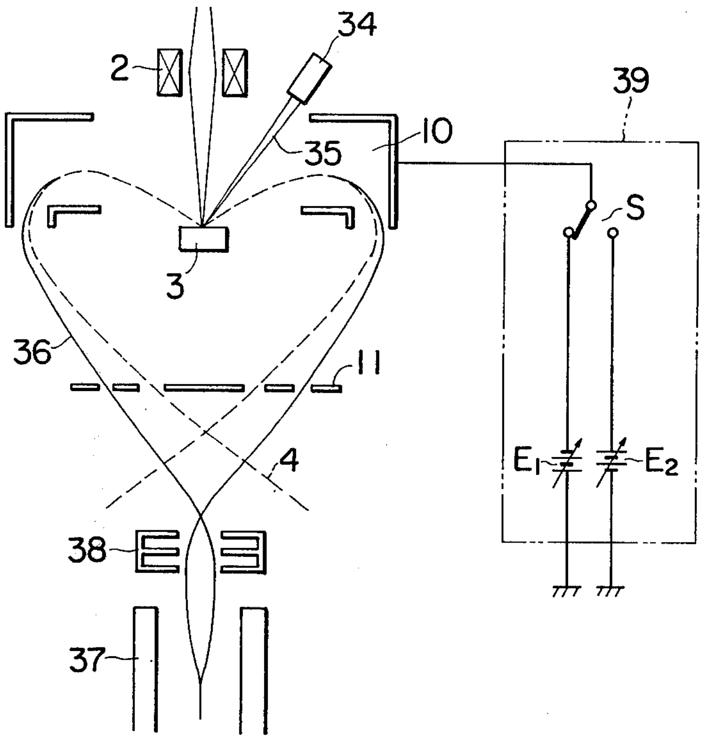
FIG. 6 is a diagrammatic view for explaining parts of the embodiment of FIG. 5.

FIG. 5 is a diagrammatic view of another embodiment of this invention, relating to an analyzing apparatus in which a mass spectrometer is coaxially arranged in a cylindrical mirror type analyzer, whereby multiplex excitation means and multiplex signal detection means are complementarily applied to an identical point of the surface layer of a sample. In FIG. 5, numeral 39 designates a deflecting power source which serves to apply voltages to the deflecting electrode system 10 and whose circuit is constructed as shown in FIG. 6.

Description will be made of a case where, in the apparatus, the sample surface is irradiated by electrons and Auger electrons emitted therefrom are analyzed. At this time, a switch S is connected in a direction as shown in FIG. 6. In this case, as explained on the embodiment of FIG. 3, the Auger electron rays emitted from the point P of the irradiation with the primary electron beam are converged on the slit P' provided in the plate 11. The electron rays having passed through the slits P' are analyzed by the cylindrical mirror type analyzing system 12 which is arranged with its object point lying at the position P'. Only the electrons having certain specific energies are focused on the slit 8-3 situated at P'' on the axis, and a signal is detected by the detector 5 located behind it. The signal is fed via a lock-in amplifier 31, and is recorded by a recorder 32. The voltage to be applied to the cylinderical mirror type analyzer suffices for all the elements when the scanning of 0∼2,000 V or so is performed with a scanning power source 33.

Description will now be made of a case where the mass is analyzed by irradiating the sample surface with an ion beam and detecting secondary ions emitted from the sample surface. In this case, the switch S shown in FIG. 6 is changed-over in the direction opposite to that for the Auger electron analysis.

An ion beam 35 emitted from an ion gun 34 is projected onto the sample surface, and secondary ions 36 are emitted from the sample surface. The secondary ions 36 pass through the deflecting electrode system 10 while depicting substantially the same orbits as those of the Auger electrons 4, and arrive at the plate 11 having slits P'. The secondary ions 36 having passed through the slits travel so as to cross on the axis, and focus on the axis. When an electrostatic lens 38 having foci on the focusing points is provided, the secondary ions 36 having passed through the electrostatic lens 38 become substantially parallel rays. Therefore, when a quadrupole mass analyzer 37 is arranged at the stage following the electrostatic lens 38, it becomes possible to easily carry out the mass analysis of the secondary ions 36. The subsequent signal detection and recording may be performed as in the Auger electron analysis.

In FIG. 5, the points at which the secondary ions 36 cross lie on the opposite side to the electron gun portion 1 as viewed from the sample. It is also possible by changing the sense of the deflecting electrode system 10 that the secondary ions cross on the side of the electron gun portion 1.

As described above in detail, according to this invention, there can be provided an electrostatic charged-particle analyzer which is excellent in the energy resolution and the areal resolution on the sample surface, which is high in the S/N ratio, in which the handling operations in evacuation, etc., are convenient and in which the accepted solid angle is large.

When the deflecting electrode system and the cylindrical mirror type analyzing system of the electrostatic charged-particle analyzer are split into a plurality of parts in planes containing the axis, the energy analyses of electrons having different energies can be simultaneously conducted. Therefore, in the Auger analysis, there can be eliminated the influences of the decrease of a peak value due to surface contamination, the displacement of an analytical point between before and after ion etching, etc., the influences being encountered in the analysis in the direction of depth of the ion etching, etc., by the prior-art apparatus. In addition, the simultaneous analysis of the time changes of a large number of peaks becomes possible.

We claim:

1. In apparatus for analyzing charged particles emitted from a sample by irradiating it with a primary beam, an electrostatic charged-particle analyzer comprising a deflecting electrode system which focuses said charged particles on the axis of said primary beam or an extension thereof or on an identical circumference about said axis or said extension, a slit disposed at the focusing position of said charged particles, a cylindrical mirror type analyzing system having its object point at said focusing position, a detector which detects said charged particles received from said cylindrical mirror type analyzing system, and a mass analysing system which is coaxially arranged inside said cylindrical mirror type analyzing system.

2. The analyzer according to claim 1, wherein said deflecting electrode system is provided so as to focus said charged particles on a side opposite to the primary beam side with respect to said sample.

3. The analyzer according to claim 1, wherein said deflecting electrode system is constructed of two electrodes which are axially symmetric and whose sections in a plane containing the axis of symmetry are L-shaped.

4. In apparatus for analyzing charged particles emitted from a sample by irradiating it with a primary beam, an electrostatic charged-particle analyzer comprising a deflecting electrode system which focuses said charged particles on an axis of said primary beam or an extension thereof or on an identical circumference about said axis or said extension, a slit which, when said charged particles are Auger electrons, is disposed at the focusing position thereof, a cylindrical mirror type analyzing system having its object point coincident with said focusing position, an electrostatic lens means having a focus at the focusing position thereof for deflecting said secondary ions substantially in parallel, a mass analyzer coaxially arranged inside said cylindrical mirror type analyzing system in order to analyze the secondary ions having passed through said electrostatic lens, and a detector which detects the charged particles from said cylindrical mirror type analyzing system or said mass analyzer.

5. The analyzer according to claim 4, wherein said deflecting electrode system includes means for focusing said charged particles on the side of said sample opposite to said primary beam.

6. The analyzer according to claim 4, wherein said deflecting electrode system is constructed of two electrodes which are axially symmetric and whose sections in a plane containing the axis of symmetry are L-shaped.

* * * * *